(12) United States Patent
Moribe

(10) Patent No.: US 11,760,107 B2
(45) Date of Patent: Sep. 19, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Shoei Moribe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 225 days.

(21) Appl. No.: 17/031,078

(22) Filed: Sep. 24, 2020

(65) Prior Publication Data

US 2021/0094314 A1 Apr. 1, 2021

(30) Foreign Application Priority Data

Sep. 30, 2019 (JP) ................................ 2019-180963

(51) Int. Cl.
*B41J 2/21* (2006.01)
(52) U.S. Cl.
CPC ........... *B41J 2/2135* (2013.01); *B41J 2/2139* (2013.01); *B41J 2/2146* (2013.01)
(58) Field of Classification Search
CPC B41J 29/393; B41J 2/2135; B41J 2029/3935; B41J 29/38; B41J 2/2146; B41J 11/46; B41J 2/2139; B41J 19/145; B41J 2/2142; B41J 2/2132; B41J 2/04505; B41J 2/0451; B41J 2/04558
See application file for complete search history.

(56) References Cited

U.S. PATENT DOCUMENTS

| | | | |
|---|---|---|---|
| 6,075,622 A | 6/2000 | Hadgis | |
| 6,462,772 B1 | 10/2002 | Bryant | |
| 2002/0034336 A1 | 3/2002 | Shiota | |
| 2003/0085950 A1 | 5/2003 | Yashima | |
| 2006/0126139 A1 | 6/2006 | Tanaka | |
| 2007/0201106 A1 | 8/2007 | Cattrone | |
| 2009/0027730 A1 | 1/2009 | Monga | |
| 2020/0001618 A1 | 1/2020 | Inagawa | |

FOREIGN PATENT DOCUMENTS

| | | |
|---|---|---|
| JP | H04-041245 A | 2/1992 |
| JP | 2006-229567 A | 8/2006 |
| JP | 4481190 B2 | 6/2010 |
| JP | 2012-076416 A | 4/2012 |
| JP | 2012147126 | 8/2012 |
| JP | 2013-169756 A | 9/2013 |
| JP | 2013237251 A | 11/2013 |
| JP | 2014-072851 A | 4/2014 |
| JP | 5617364 B2 | 11/2014 |
| WO | 2018/142708 A1 | 8/2018 |

*Primary Examiner* — Jannelle M Lebron
(74) *Attorney, Agent, or Firm* — CANON U.S.A., INC. IP Division

(57) ABSTRACT

An image processing apparatus obtains a plurality of measured values obtained by measuring a measurement image; and replaces a first measured value with a value based on a second measured value. The first measured value being included in the plurality of measured values and being unsuitable for identifying the density characteristic, and the second measured value being included in the plurality of measured values and being suitable for identifying the density characteristic.

20 Claims, 13 Drawing Sheets

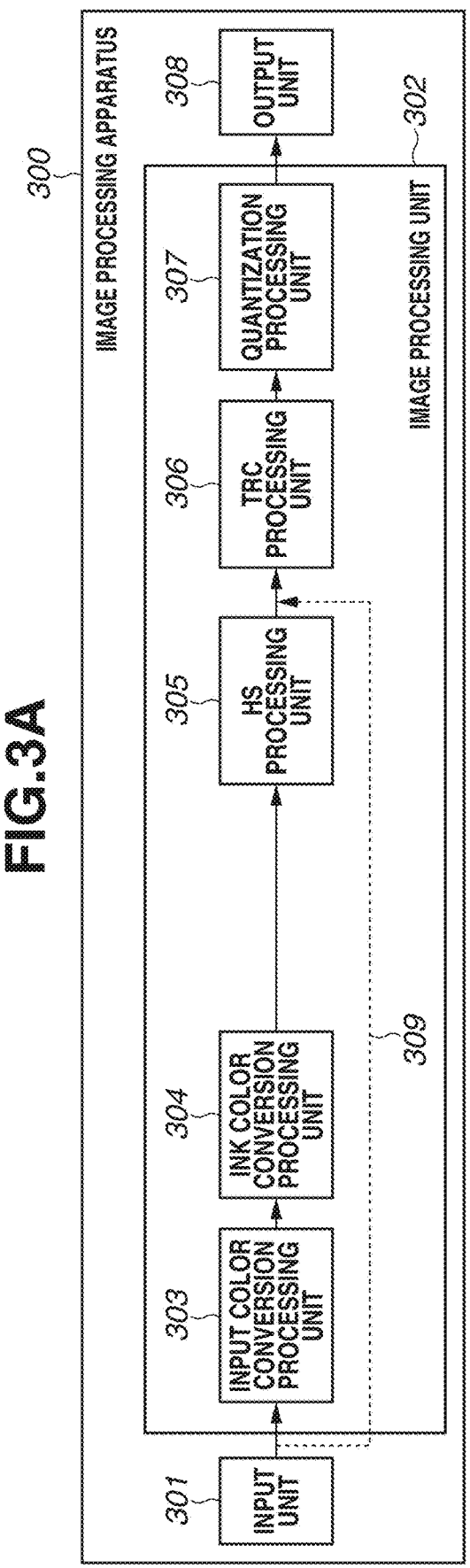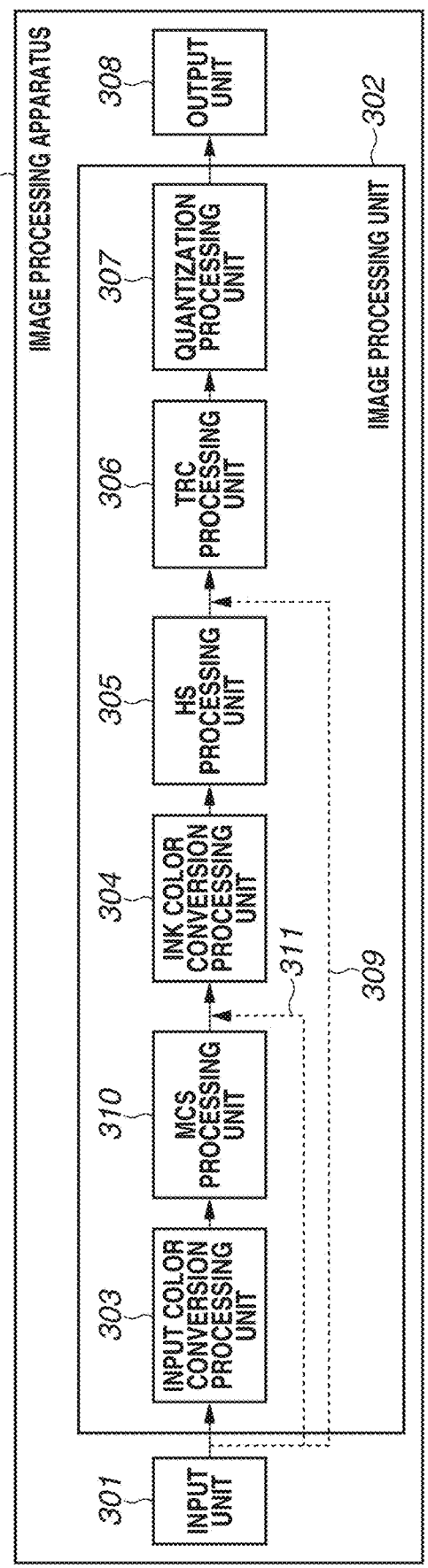

IMAGE PROCESSING APPARATUS, IMAGE PROCESSING METHOD, AND STORAGE MEDIUM

BACKGROUND OF THE DISCLOSURE

Field of the Disclosure

The aspect of the embodiments relates to an image processing technique for obtaining density characteristics of each printing element to reduce density unevenness and streaks which occur when ink is discharged to form an image.

Description of the Related Art

In printheads used for an inkjet printer, variations in the amount of ink discharge may occur among a plurality of printing elements (nozzles) due to a production error or the like. If variations in the amount of ink discharge occur, density unevenness is more likely to occur in a formed image. A head shading (HS) technique is a known technique for reducing density unevenness. In the HS technique, image data is corrected based on information about the amount of ink discharge from each printing element (density characteristics of each printing element). This correction processing makes it possible to increase or decrease the number of ink dots to be discharged from each printing element to adjust the density of an image to be formed.

To obtain density characteristics of each printing element, a method of printing each patch (e.g., a uniform image for each gradation) on paper and measuring the patch by a scanner is known. Japanese Patent Laid-Open No. 2013-237251 discusses a technique in which a recording medium onto which a pattern is fixed is set in a sheet feeding unit again and the pattern on the recording medium is scanned to obtain variation information and density information about the recording medium.

However, in the technique discussed in Japanese Patent Laid-Open No. 2013-237251, the recording medium in the sheet feeding unit is set again, which leads to an increase in the cost of obtaining density characteristics.

SUMMARY OF THE DISCLOSURE

According to one aspect of the embodiments, an apparatus that corrects a measured value obtained by measuring a measurement image formed by a printing element configured to discharge ink, the measured value being used for identifying a density characteristic of the printing element, the apparatus comprises: a first obtaining unit configured to obtain a plurality of measured values; and a first correction unit configured to replace a first measured value with a value based on a second measured value, the first measured value being included in the plurality of measured values and being unsuitable for identifying the density characteristic, the second measured value being included in the plurality of measured values and being suitable for identifying the density characteristic.

Further features of the disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIGS. 3A and 3B are block diagrams each illustrating a functional configuration of an image processing apparatus according to the first exemplary embodiment.

DESCRIPTION OF THE EMBODIMENTS

Figure 1:
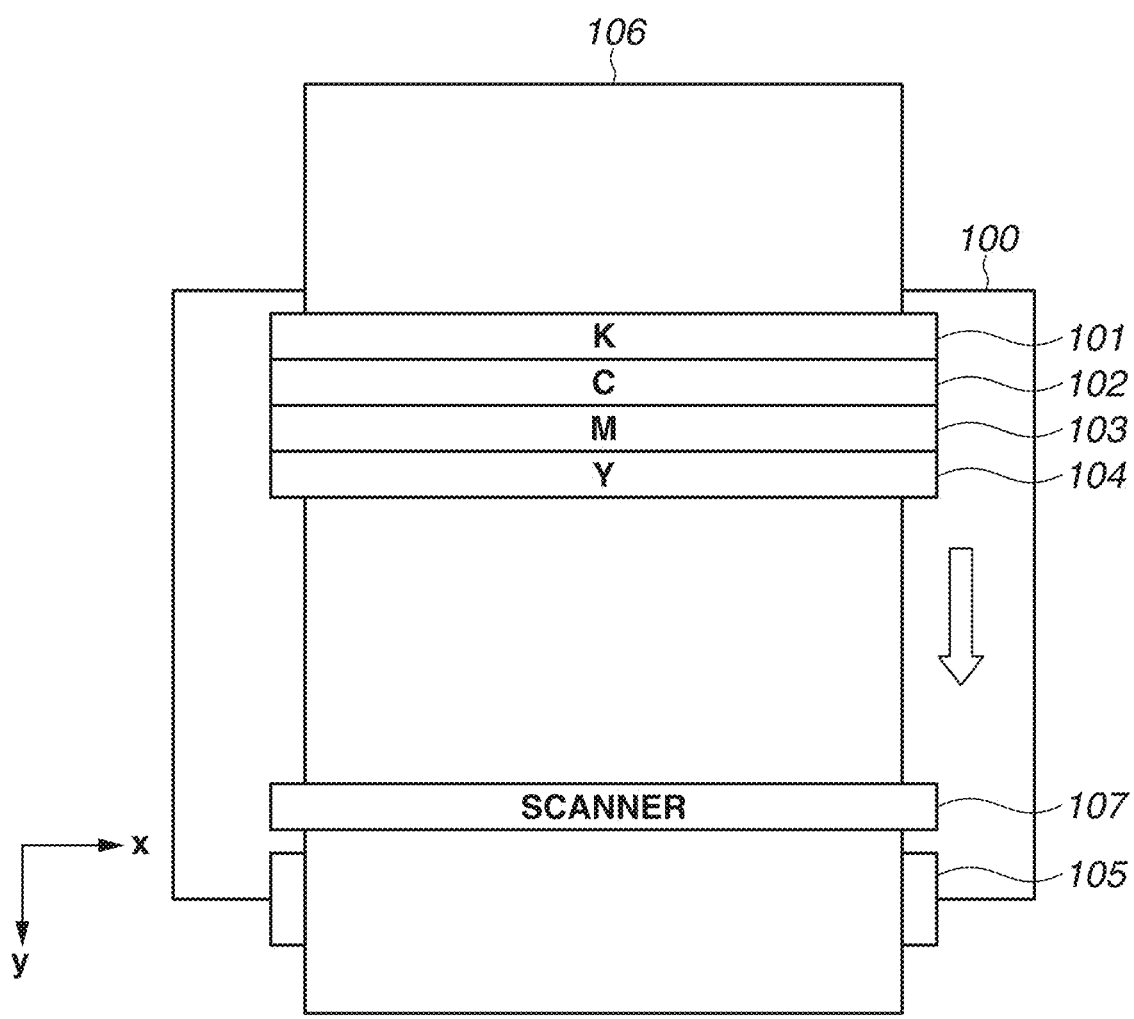
FIG. 1 schematically illustrates a configuration of an image forming apparatus according to a first exemplary embodiment.

Exemplary embodiments of the disclosure will be described in detail below with reference to the accompanying drawings. The following exemplary embodiments are not meant to limit the scope of the disclosure as encompassed by the appended claims. Not all features described in the exemplary embodiments are essential for the disclosure. The features may be arbitrarily combined. Further, in the accompanying drawings, the same or similar components are denoted by the same reference numerals, and redundant descriptions are omitted.

First Exemplary Embodiment

A first exemplary embodiment illustrates a method for obtaining density characteristics of each printing element of an image forming apparatus in an image forming system including the image forming apparatus that forms an image on a recording medium and a host apparatus that controls the image forming apparatus. In the image forming system, the density characteristics of each printing element are obtained based on control processing performed by the host apparatus. The first exemplary embodiment illustrates an example where an inkjet printer is used as the image forming apparatus and a personal computer (PC) is used as an example of the host apparatus.

<Configuration of Image Forming Apparatus>

FIG. 1 schematically illustrates a configuration of an image forming apparatus according to the present exemplary embodiment. The image forming apparatus according to the present exemplary embodiment is an inkjet printer. As illustrated in FIG. 1, an image forming apparatus 100 includes printheads 101, 102, 103, and 104. Each of the printheads 101 to 104 includes a plurality of nozzles for discharging ink. The plurality of nozzles is arranged along a predetermined direction within a range corresponding to the width of a recording sheet 106. In other words, each of the printheads 101 to 104 according to the present exemplary embodiment is a full-line printhead. The printhead 101 is a printhead for discharging black (K) ink, and the printhead 102 is a printhead for discharging cyan (C) ink. The printhead 103 is a printhead for discharging magenta (M) ink, and the printhead 104 is a printhead for discharging yellow (Y) ink. An interval between the nozzles in each of the printheads 101 to 104 is set to have a resolution of 1200 dpi.

A conveyance roller 105 (and other rollers (not illustrated)) is rotated by a driving force from a motor (not illustrated), thereby conveying the recording sheet 106, which is a recording medium, in a direction indicated by an arrow in FIG. 1. While the recording sheet 106 is conveyed, ink is discharged based on recording data from the plurality of nozzles of each of the printheads 101 to 104. As a result, an image corresponding to one raster that corresponds to a nozzle row of each of the printheads 101 to 104 is sequentially formed. In addition, a scanner 107 including scanning elements arranged at a predetermined pitch in a state where the scanning elements are arranged in parallel with the printheads 101 to 104 is disposed at a position downstream of the printheads 101 to 104 in a y-direction. The scanner 107 can scan images formed using the printheads 101 to 104 and can output the scanned images as multivalued data having a color signal value. For example, an image corresponding to one page can be formed by repeatedly performing an ink discharge operation of discharging ink from each of the printheads 101 to 104 on the conveyed recording sheet as described above.

A full-line type image forming apparatus is used as the image forming apparatus in the present exemplary embodiment. However, the present exemplary embodiment can also be applied to a serial type image forming apparatus that performs recording by scanning each of the printheads 101 to 104 in a direction crossing a recording sheet conveyance direction.

<Configuration of Image Forming System>

Figure 2:
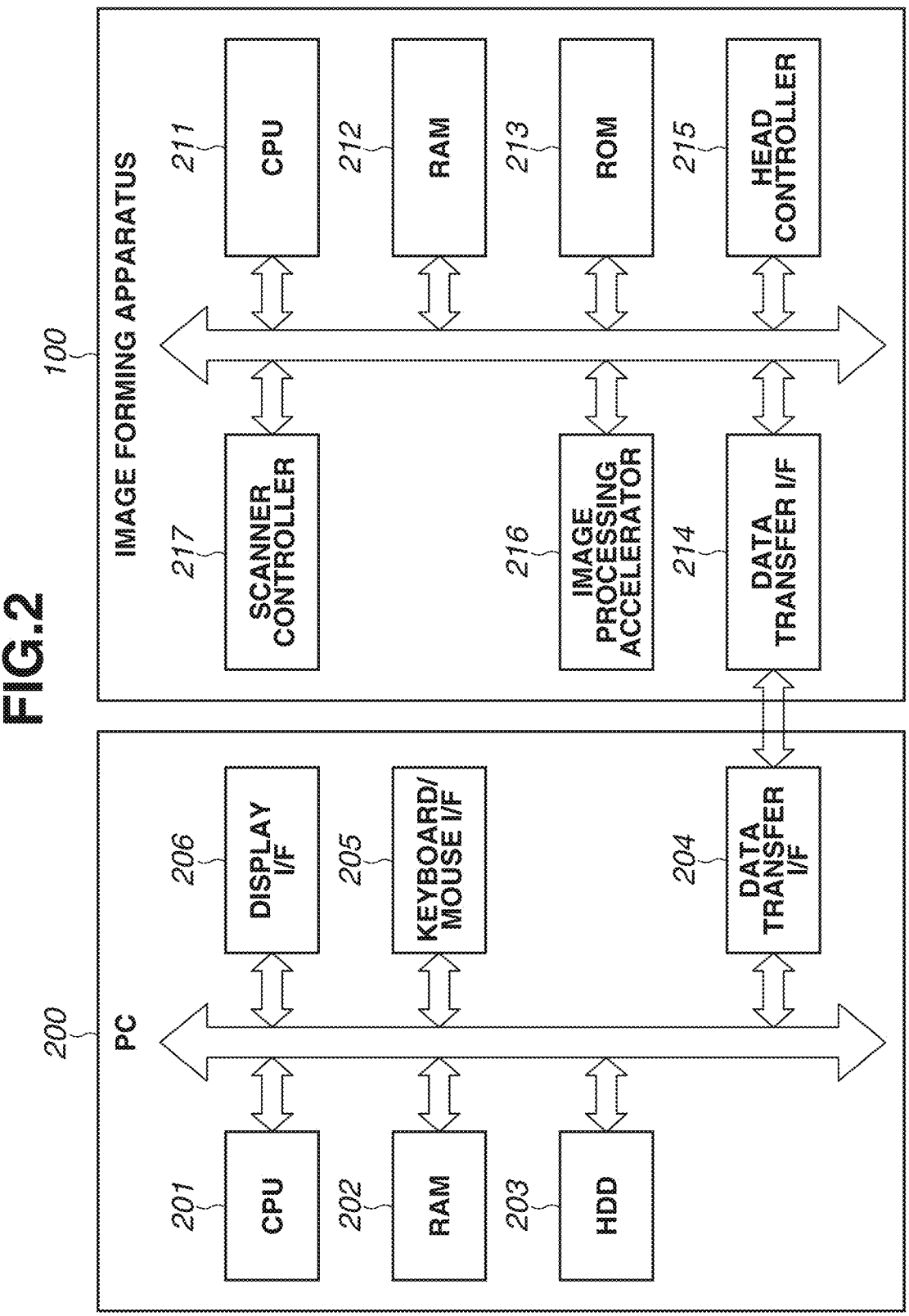
FIG. 2 is a block diagram illustrating a configuration of an image forming system according to the first exemplary embodiment.

FIG. 2 is a block diagram illustrating the configuration of the image forming system according to the present exemplary embodiment. As illustrated in FIG. 2, the image forming system according to the present exemplary embodiment includes the image forming apparatus 100 illustrated in FIG. 1 and a PC 200 serving as the host apparatus that controls the image forming apparatus 100.

The PC 200 includes a central processing unit (CPU) 201, a random access memory (RAM) 202, a hard disk drive (HDD) 203, a data transfer interface (I/F) 204, a keyboard/mouse I/F 205, and a display I/F 206. The CPU 201 executes various processes based on programs held in the HDD 203 and the RAM 202. In particular, the CPU 201 executes programs to execute processing for an image processing apparatus 300 according to an exemplary embodiment to be described below. The RAM 202 is a volatile storage and temporarily holds programs and data. The HDD 203 is a nonvolatile storage and can hold programs and table data generated by processing according to each exemplary embodiment to be described below. The data transfer I/F 204 controls transmission and reception of data to and from the image forming apparatus 100. As a connection method for transmitting and receiving data, a universal serial bus (USB), Institute of Electrical and Electronics Engineers (IEEE) 1394, a local area network (LAN), and the like can be used. The keyboard/mouse I/F 205 is an I/F for controlling a human interface device (HID) such as a keyboard or a mouse. A user inputs data via the keyboard/mouse I/F 205. The display I/F 206 controls display on a display (not illustrated).

The image forming apparatus 100 includes a CPU 211, a RAM 212, a read-only memory (ROM) 213, a data transfer I/F 214, a head controller 215, an image processing accelerator 216, and a scanner controller 217. The CPU 211 executes processing based on programs held in the ROM 213 and the RAM 212. The RAM 212 is a volatile storage and temporarily holds programs and data. The ROM 213 is a nonvolatile storage and holds data and programs. The data transfer I/F 214 controls transmission and reception of data to and from the PC 200. The head controller 215 supplies recording data to each of the printheads 101 to 104 illustrated in FIG. 1 and controls the printhead discharge operation. Specifically, the head controller 215 can be configured to read a control parameter and recording data from a predetermined address in the RAM 212. When the CPU 211 writes the control parameter and recording data at the predetermined address in the RAM 212, processing is started by the head controller 215 and ink is discharged from each of the printheads 101 to 104. The CPU 211 also functions as a formation control unit for forming a measurement image to be described below. The image processing accelerator 216 executes image processing at a higher speed than the CPU 211. Specifically, the image processing accelerator 216 can be configured to load a parameter and data for image processing from a predetermined address in the RAM 212. When the CPU 211 writes the parameter and data at the predetermined address in the RAM 212, the image processing accelerator 216 is started to perform predetermined image processing. Note that the image processing accelerator 216 need not necessarily be provided. The processing may be executed by the CPU 211 alone depending on, for example, the specifications of the image forming apparatus 100. The scanner controller 217 controls each scanning element of the scanner 107 illustrated in FIG. 1 and outputs data obtained by scanning to the CPU 211.

<Functional Configuration of Image Processing Apparatus>

FIG. 3A is a block diagram illustrating the functional configuration of the image processing apparatus 300 included in the PC 200. The image processing apparatus 300 includes an input unit 301, an image processing unit 302, and an output unit 308.

As illustrated in FIG. 3A, the input unit 301 receives image data and outputs the image data to the image processing unit 302. The image processing unit 302 includes an input color conversion processing unit 303, an ink color conversion processing unit 304, and a head shading (HS) processing unit 305. The image processing unit 302 further includes a tone reproduction curve (TRC) processing unit 306 and a quantization processing unit 307.

The input color conversion processing unit 303 converts the input image data obtained from the input unit 301 into image data corresponding to a color reproduction range of a printer. The input image data used in the present exemplary embodiment is data representing coordinates (R, G, B) in a standard red, green, and blue (sRGB) color space, which is a color space corresponding to a display. The sRGB color space is a space in which "R", "G", and "B" are each set as an axis, and each coordinate is represented by eight bits. Accordingly, the input image data is image data in which R, G, and B values are each represented by eight bits. The input color conversion processing unit 303 converts an input color signal value for each of the R, G, and B values in the input image data into a printer color signal value for each of R', G', and B' values corresponding to the color reproduction range of the printer. The color signal value for each of the R, G, and B values is hereinafter expressed as a color signal value (R, G, B). In the conversion processing, a known method, such as matrix operation processing or processing using a three-dimensional lookup table (LUT), is used. In the present exemplary embodiment, the conversion processing is performed using the three-dimensional LUT and an interpolation operation. The resolution of 8-bit image data that is treated in the image processing unit 302 is 1200 dpi.

The ink color conversion processing unit 304 performs conversion processing for converting the color signal values in the image data converted by the input color conversion processing unit 303 into color signal values corresponding to a plurality of types of ink. The image forming apparatus 100 uses black (K) ink, cyan (C) ink, magenta (M) ink, and yellow (Y) ink. Accordingly, a printer color signal value (R', G', B') is converted into an ink color signal value (K, C, M, Y). The K, C, M, and Y values are also represented by eight bits, like the R, G, and B values. Like the input color conversion processing unit 303, the ink color conversion processing unit 304 also performs the conversion processing using the three-dimensional LUT and the interpolation operation.

Figure 13:
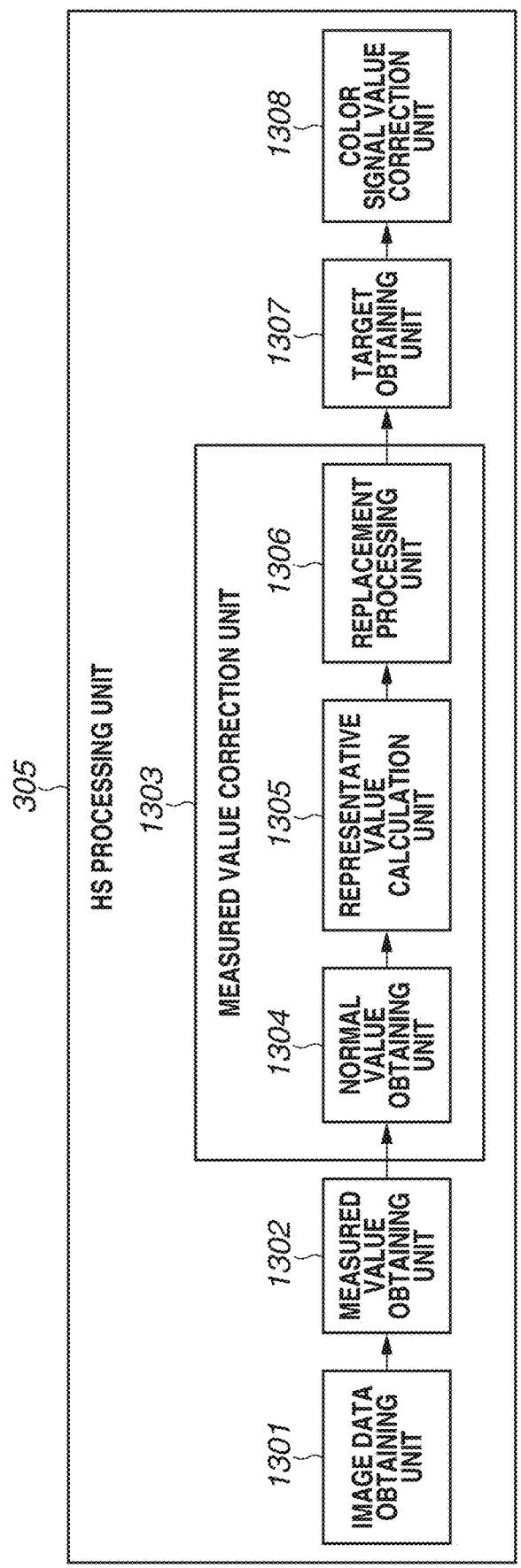
FIG. 13 is a block diagram illustrating a functional configuration of an HS processing unit.

The HS processing unit 305 performs correction processing based on the density characteristics of the nozzles constituting each of the printheads 101 to 104 on the image data having the ink color signal value (K, C, M, Y). FIG. 13 is a block diagram illustrating the detailed functional configuration of the HS processing unit 305. The HS processing unit 305 includes an image data obtaining unit 1301, a measured value obtaining unit 1302, a measured value correction unit 1303, a target obtaining unit 1307, and a color signal value correction unit 1308. The measured value correction unit 1303 includes a normal value obtaining unit 1304, a representative value calculation unit 1305, and a replacement processing unit 1306. HS processing performed by the HS processing unit 305 will be described in detail below.

The TRC processing unit 306 adjusts, for each color of ink, the number of ink dots to be recorded by the image forming apparatus 100 on image data having an HS color signal value (K', C', M', Y') obtained by the HS processing. Specifically, the image data is corrected such that the relationship between the number of dots to be recorded on a recording medium and the brightness achieved by the dots becomes linear. This correction processing enables adjustment of the number of dots to be recorded on a recording medium.

The quantization processing unit 307 performs quantization processing (halftone processing) on image data having a TRC color signal value (K", C", M", Y") obtained by TRC processing, and generates binary data in which each pixel value is represented by one bit. The binary data that is used as recording data represents an arrangement of ink dots to be discharged. In the present exemplary embodiment, a known dithering method is used as a method for quantization processing, but instead, a known error diffusion method or the like may be used.

The output unit 308 outputs the binary data obtained by the quantization processing to the image forming apparatus 100. The image forming apparatus 100 drives each of the printheads 101 to 104 based on the received binary data and discharges ink of each color onto a recording medium to form an image on the recording medium.

<Processing Executed by Image Processing Apparatus>

Figure 12A:
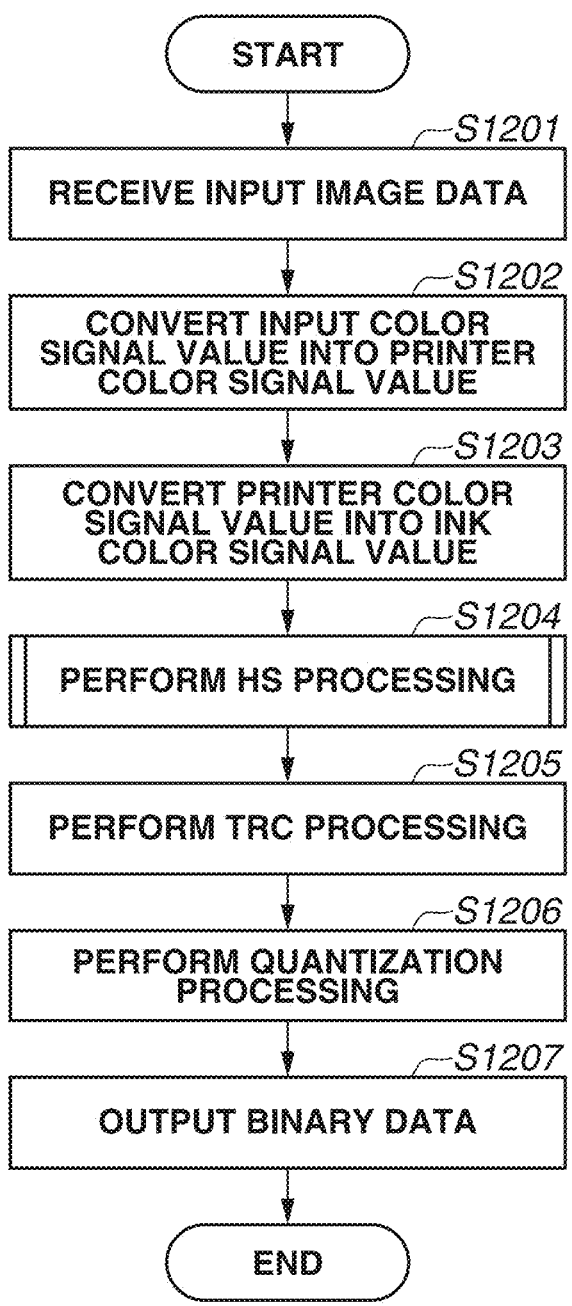
FIGS. 12A and 12B are flowcharts each illustrating processing executed by the image processing apparatus.

FIG. 12A is a flowchart illustrating processing executed by the image processing apparatus 300. The processing executed by the image processing apparatus 300 will be described in detail below with reference to FIG. 12A. In the following description, each step is denoted by "S" followed by a number.

In step S1201, the input unit 301 receives input image data and outputs the received image data to the image processing unit 302. In step S1202, the input color conversion processing unit 303 converts the input color signal value (R, G, B) of the input image data into the printer color signal value (R', G', B') corresponding to the color reproduction range of the printer. In step S1203, the ink color conversion processing unit 304 coverts the printer color signal value (R', G', B') into the ink color signal value (K, C, M, Y) corresponding to a plurality of types of ink. In step S1204, the HS processing unit 305 performs HS processing on the image data having the ink color signal value (K, C, M, Y). In step S1205, the TRC processing unit 306 performs TRC processing on the image data having the HS color signal value (K', C', M', Y') obtained by the HS processing. In step S1206, the quantization processing unit 307 performs quantization processing on the image data having the TRC color signal value (K", C", M", Y") obtained by the TRC processing. In step S1207, the output unit 308 outputs the binary data generated by the quantization processing to the image forming apparatus 100.

<HS Processing>

Figure 4:
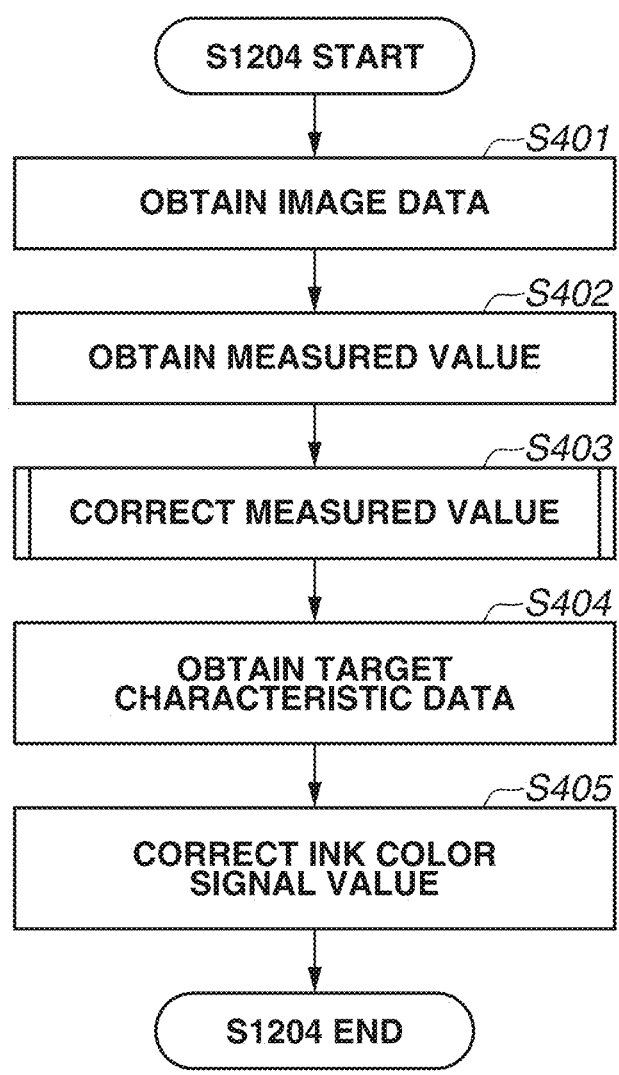
FIG. 4 is a flowchart illustrating head shading (HS) processing.

FIG. 4 is a flowchart illustrating the HS processing performed by the HS processing unit 305. The HS processing will be described in detail below with reference to FIG. 4.

In step S401, the image data obtaining unit 1301 obtains image data having the ink color signal value (K, C, M, Y) output from the ink color conversion processing unit 304. In step S402, the measured value obtaining unit 1302 obtains a measured value for identifying density characteristics of each nozzle. The measured value is obtained as image data in advance by preliminarily measuring the measurement image by the scanner 107, and the image data is held in the HDD 203 or the like.

Figure 5:
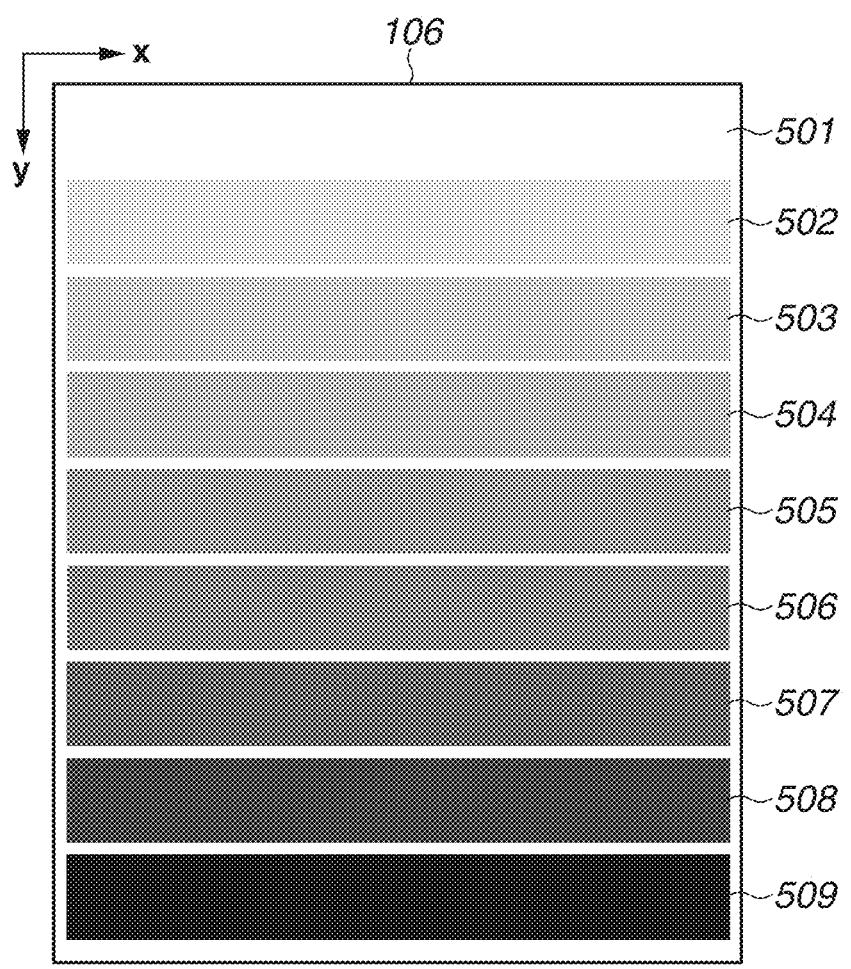
FIG. 5 illustrates an example of a measurement image.

A method for generating image data including a measured value will be described below. First, a measurement image for obtaining density characteristics of each nozzle is formed on the recording sheet 106. FIG. 5 illustrates an example of the measurement image. Patches corresponding to nine gradations of 501, 502, 503, 504, 505, 506, 507, 508, and 509, respectively, are formed on the recording sheet 106. Each patch is formed using only ink of a single color. An example where a patch is formed using only the printhead 101 (K ink) will be described below. In the present exemplary embodiment, processing for forming the measurement image uses only ink of a single color, and thus the processing is performed through a bypass path 309 indicated by a dashed line in FIG. 3A. With this configuration, the input image data can be directly input to the TRC processing unit 306 without passing through the input color conversion processing unit 303, the ink color conversion processing unit 304, and the HS processing unit 305.

Next, the measurement image is scanned by the scanner 107 and a scanned image is obtained by scanning Each pixel value of the scanned image is obtained using three channels of (R, G, B). Next, the scanned image is converted into a scanned image in which a pixel value corresponding to one channel is included in each pixel by using a color conversion table, which is prepared in advance, according to the color characteristics of the scanner 107. In the present exemplary embodiment, the scanned image is converted into a 16-bit value that is linear to "Y" in a CIE XYZ color space. Any color space can be used to represent each pixel value of the scanned image obtained after color conversion. For example, "L*" in a CIEL*a*b* color space, or a density may be used. In a case where the measurement image is formed using color ink of C, M, Y, or the like, a value corresponding to chroma can also be used instead of a value corresponding to brightness. For example, R, G, and B values may be used as values corresponding to complementary colors of C, M, and Y, respectively. The resolution of the scanned image in the present exemplary embodiment is 1200 dpi. The above-described processing makes it possible to generate image data having each pixel value of the scanned image as the measured value and to obtain the image data in step S402.

Figure 6A:
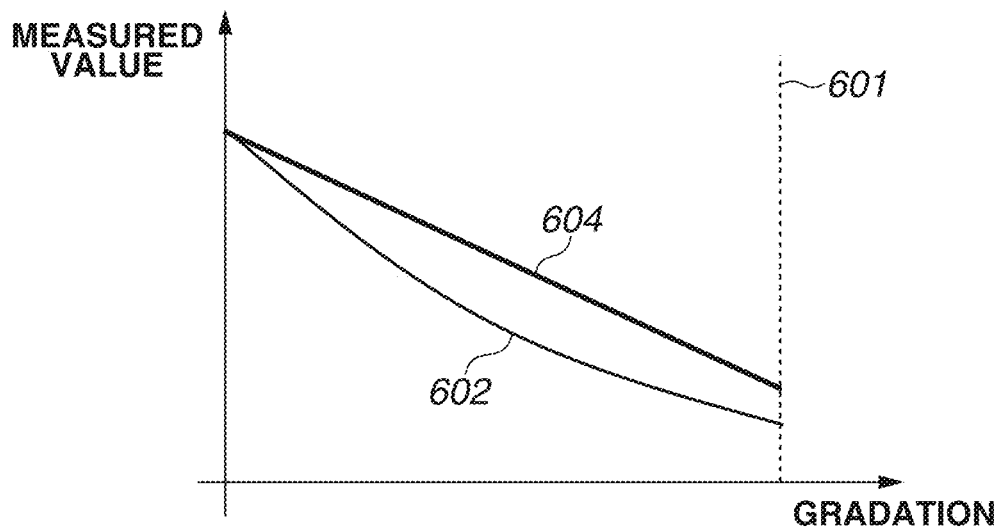
FIGS. 6A and 6B are graphs each illustrating HS processing.

In step S403, the measured value correction unit 1303 corrects the measured value obtained in step S402. Processing for correcting the measured value will be described in detail below. In step S404, the target obtaining unit 1307 obtains target characteristic data representing a target characteristic based on a measurement curve generated based on the corrected measured value. The term "target characteristic" used herein refers to a predetermined target density characteristic based on a measurement curve for each nozzle. As illustrated in FIG. 6A, a horizontal axis represents a gradation and a vertical axis represents a measured value. Referring to FIG. 6A, a straight line that is linear to a gradation represents a target characteristic 604. A dashed line 601 indicates an upper limit of the horizontal axis. Since the input signal value is represented by an 8-bit value, the upper limit in the present exemplary embodiment is 255. A measurement curve 602 is a curve generated by plotting the measured value in the scanned image of each of the patches 501 to 509 and performing an interpolation operation. A known piecewise linear interpolation is used for the interpolation operation in the present exemplary embodiment. A known spline curve or the like may be used as the measurement curve. The measurement curve 602 represents the density characteristic of a nozzle corresponding to a pixel position "x", and a number of curves corresponding to the number of nozzles used for forming the measurement image are obtained. Different measurement curves for the density characteristics of each nozzle are obtained. For example, the measurement curve for the nozzle that discharges a small amount of ink is shifted upward (in a direction in which the brightness increases). In each gradation, a number of measured values corresponding to the width of each patch in the y-direction are obtained. Accordingly, average values of the measured values obtained in the y-direction in each gradation are used as nine measured values to generate the measurement curve.

Figure 6B:
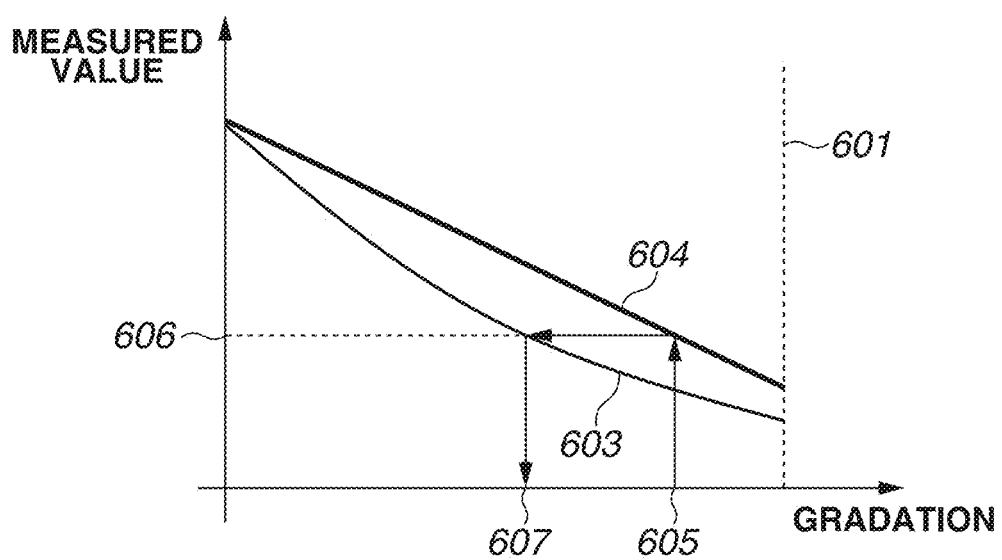

In step S405, the color signal value correction unit 1308 corrects the ink color signal value (K, C, M, Y) of the image data obtained in step S401 based on the measured value calculated in step S403, and obtains the HS color signal value (K', C', M', Y'). A method for obtaining the HS color signal value (K', C', M', Y') will be described with reference to FIG. 6B. Referring to FIG. 6B, an input value 605 represents the ink color signal value (K, C, M, Y). The color signal value correction unit 1308 obtains the value of the target characteristic 604 corresponding to the input value 605, and uses the obtained value as a target value 606. Further, a signal value 607 of a measurement curve 603 corresponding to the target value 606 is obtained as the corrected HS color signal value (K', C', M', Y'). The measurement curve 603 used herein is a measurement curve obtained by performing a piecewise linear interpolation on the measured value corrected in step S403.

<Processing for Correcting Measured Value>

Figure 7A:
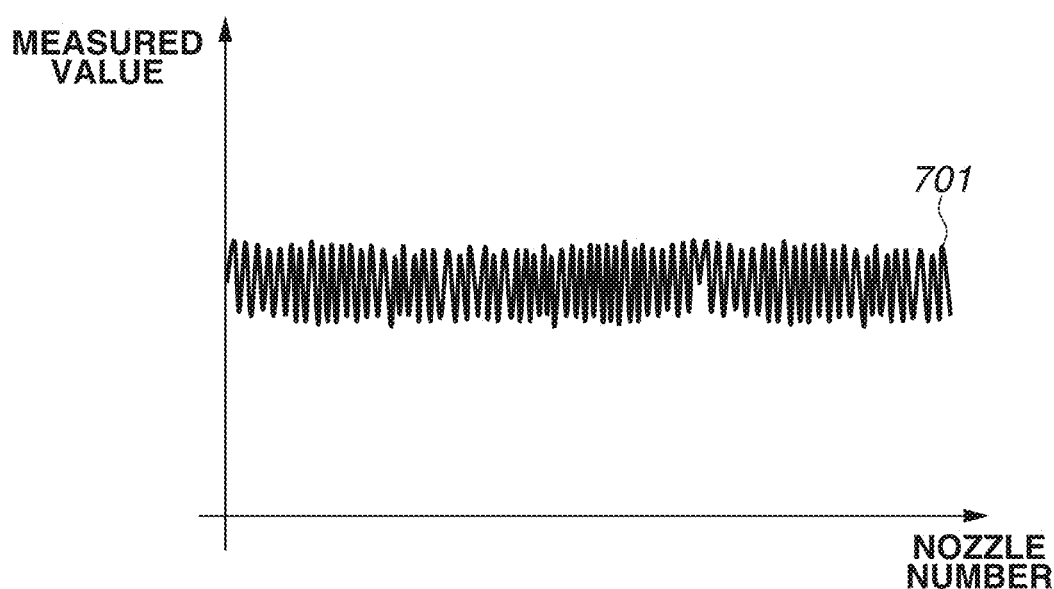
FIGS. 7A and 7B are graphs each illustrating an example of a measured value obtained by measuring a measurement image.
Figure 7B:
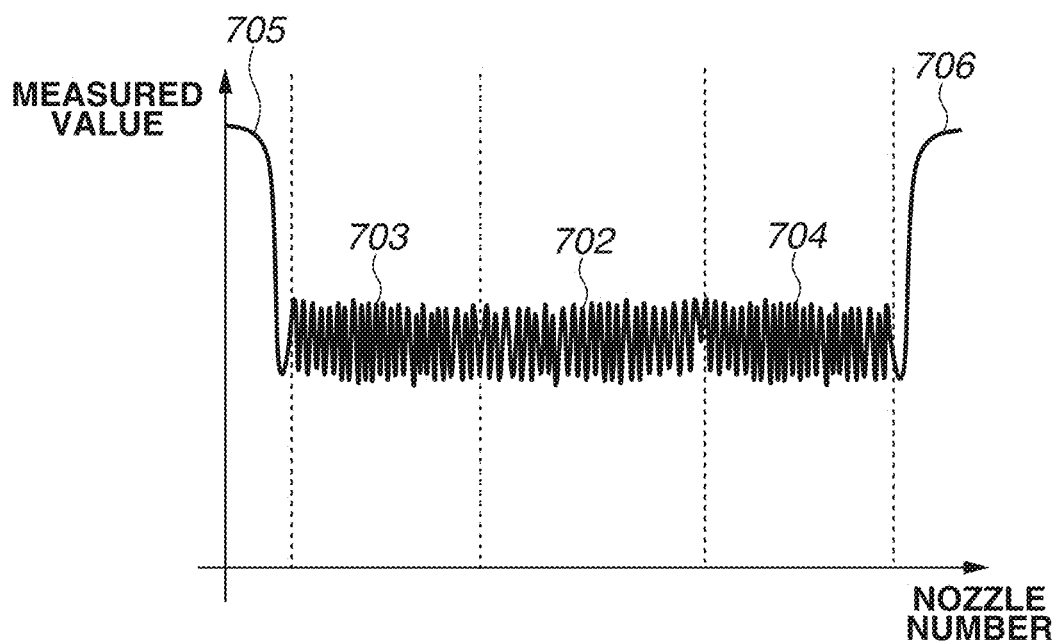

Processing for correcting a measured value will be described in detail below. FIGS. 7A and 7B are graphs each illustrating an example of a measured value for the measurement image illustrated in FIG. 5. In the graphs illustrated in FIGS. 7A and 7B, a horizontal axis represents a nozzle number, which corresponds to the number of nozzles included in the printhead 101, and a vertical axis represents a measured value. A measured value 701 is a measured value in a region corresponding to the patch 509 illustrated in FIG. 5. Similarly, measured values in regions corresponding to the patches 501 to 508, respectively, are also obtained, but the illustration of the measured values is omitted to simplify the explanation. As described above, a number of measured values corresponding to the width of each patch in the y-direction in each gradation are obtained. In this case, however, the average value of the measured values in the y-direction in the gradation of the patch 509 is illustrated.

FIG. 7A is a graph illustrating the measured value when no distortion occurs in the recording sheet on which the measurement image is formed. This is an example of the measured value obtained in the configuration of the apparatus in which the printheads 101 to 104 and the scanner 107 illustrated in FIG. 1 are installed at a sufficiently small distance. On the other hand, FIG. 7B illustrates the measured value when distortion occurs in the recording sheet on which the measurement image is formed. This is an example of the measured value obtained in the configuration of the apparatus in which the printheads 101 to 104 and the scanner 107 are installed at a large distance, or a drying step is provided between the printheads 101 to 104 and the scanner 107. This configuration of the apparatus enables a highly accurate measurement by performing the measurement after the color of each ink recorded on the recording sheet is stabilized.

Comparing FIG. 7B with FIG. 7A, it is obvious that the measured value at an end of the recording sheet cannot be obtained due to the distortion of the recording sheet. A measured value 702 is a measured value at a central portion in an x-direction of the recording sheet, and represents a characteristic similar to that represented by the measured value 701 when no distortion occurs. Measured values 703 and 704 are measured values obtained at ends in the x-direction of the recording sheet, and the interval of waveforms of the measured values 703 and 704 is smaller than that of the measured value 702 obtained at the central portion. This is because the ends of the recording sheet are uplifted and the recording sheet is inclined with respect to the scanner 107. Measured values 705 and 706 are measured values obtained at extreme ends in the x-direction of the recording sheet, and include a measured value corresponding to a blank region in which the patches illustrated in FIG. 5 are not formed. Accordingly, the HS processing unit 305 according to the present exemplary embodiment replaces a measured value corresponding to a region in which the measured value cannot be accurately obtained (the region is hereinafter referred to as an abnormal region) with a measured value corresponding to a region in which the measured value can be accurately obtained (the region is hereinafter referred to as a normal region). The normal region in the present exemplary embodiment is a region corresponding to a central portion of the recording sheet that is not affected by the distortion of the recording sheet. The abnormal region in the present exemplary embodiment is a region corresponding to each end and each extreme end of the recording sheet which are affected by the distortion of the recording sheet. It is assumed that the normal region and the abnormal region are set in advance.

Figure 8:
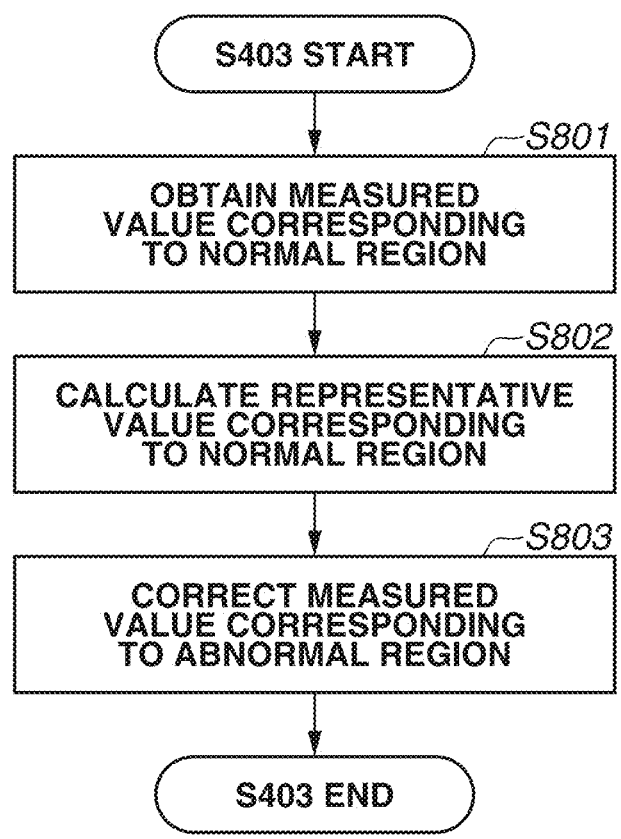
FIG. 8 is a flowchart illustrating processing for correcting a measured value.
Figure 9A:
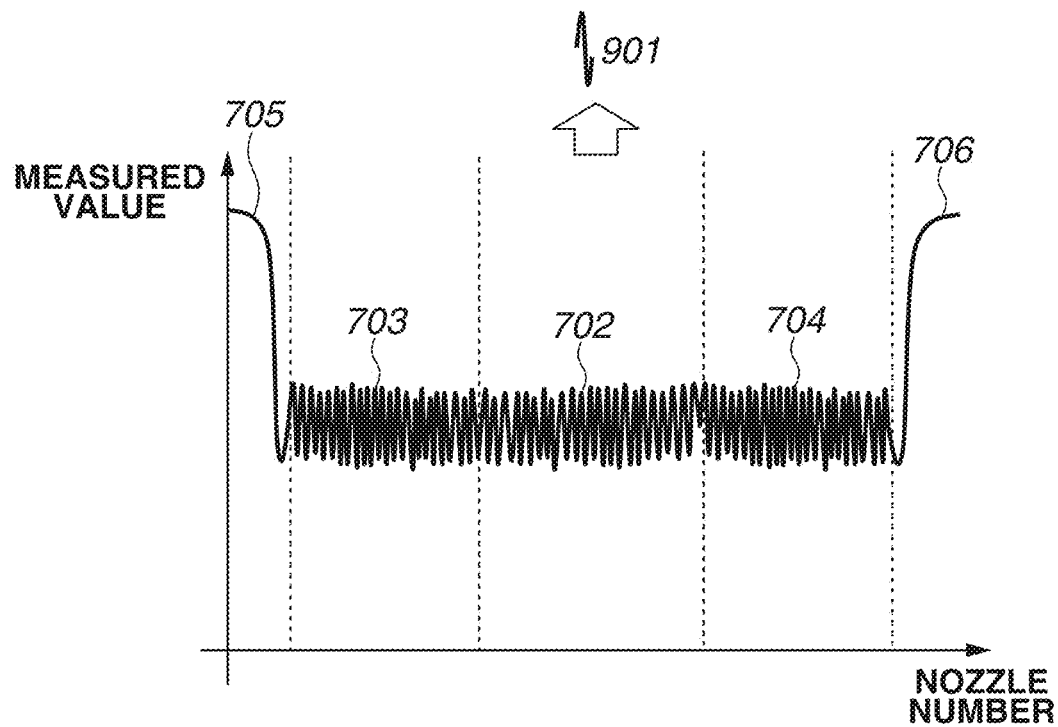
FIGS. 9A and 9B are graphs each illustrating processing for correcting a measured value.

FIG. 8 is a flowchart illustrating processing for correcting a measured value in the HS processing unit 305. In step S801, the normal value obtaining unit 1304 obtains the measured value corresponding to the normal region. Among the measured values illustrated in FIG. 9A, the measured value 702 corresponding to the central portion indicated by a dashed line is obtained as the measured value corresponding to the normal region. In the present exemplary embodiment, 320 nozzles correspond to the central portion. Accordingly, the normal value obtaining unit 1304 obtains 320 measured values as the measured value 702.

In step S802, the representative value calculation unit 1305 calculates a representative value of the measured values corresponding to the normal region. In the present exemplary embodiment, density unevenness is extracted every 32 nozzles. Therefore, in a case where numbers 1 to 320 are added to the 320 obtained measured values, respectively, a first representative value is obtained by averaging 10 measured values with the numbers of 1, 33, 65, 97, 129, 161, 193, 225, 257, and 289, respectively. Similarly, second and third representative values are calculated to thereby obtain 32 representative values 901.

Figure 9B:
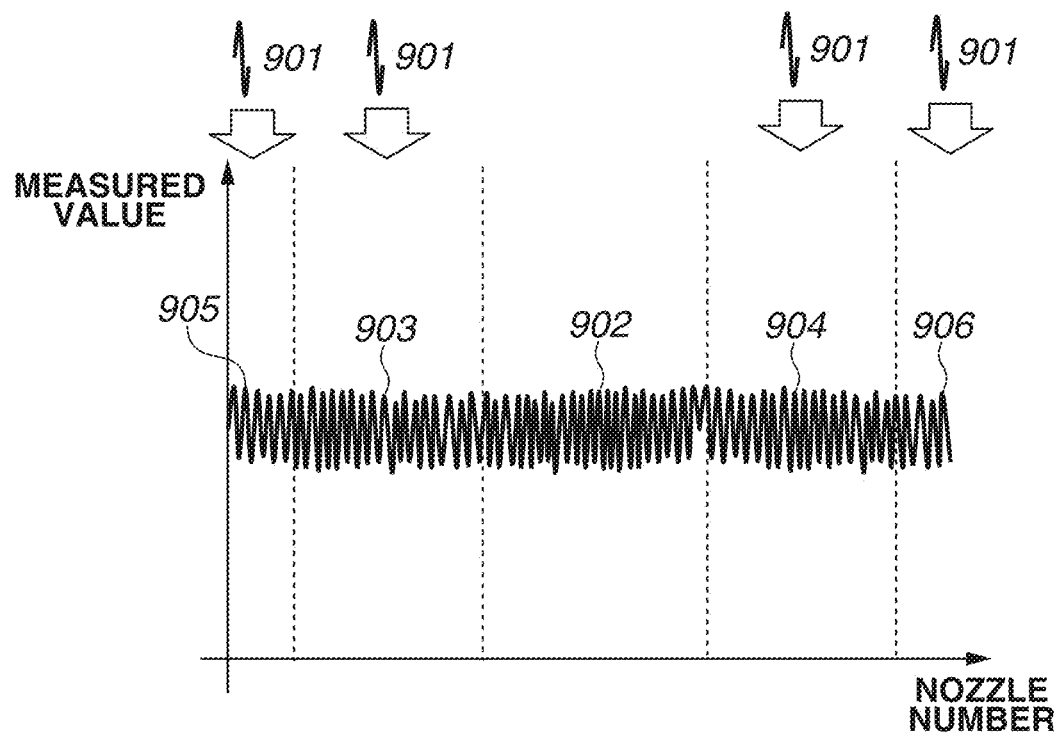

In step S803, the replacement processing unit 1306 corrects the measured value corresponding to the abnormal region. Specifically, the replacement processing unit 1306 replaces the measured value corresponding to the abnormal region with the representative value calculated in step S802 as illustrated in FIG. 9B. For example, in a case where 320 measured values are obtained as the measured value 703, the measured value 703 is repeatedly replaced with the 320 replaced measured values 903 generated by repeatedly replacing the 32 representative values 901. Similarly, replaced measured values 904, 905, and 906 are obtained by repeatedly replacing the 32 representative values 901. Since the measured values are directly replaced with the 32 representative values 901, it may be desirable to set the size of the abnormal region to be an integral multiple of the size of the normal region. Since the replacement processing is not performed on the measured value corresponding to the normal region, a measured value 902 is the same as the measured value 702.

Advantageous Effects of First Exemplary Embodiment

As described above, the image processing apparatus 300 according to the present exemplary embodiment obtains a plurality of measured values by measuring a measurement image. A measured value that is included in the plurality of obtained measured values and is unsuitable for identifying the density characteristics of each printing element is replaced with a value that is suitable for identifying the density characteristics corresponding to a measured value. With this configuration, even when a measured value that cannot be used is included in the measured values obtained by measuring the measurement image, the density characteristics of each printing element can be obtained with high accuracy. In addition, the HS processing using the density characteristics of each printing element can reduce density unevenness and streaks in an image formed on a recording medium.

Modified Examples

In step S802 according to the exemplary embodiment described above, the average value of measured values is used as the representative value. However, the representative value is not limited to the average value. For example, a median may be used as the representative value. Alternatively, the average value may be calculated after weighting is performed based on the position of each nozzle. In the case of calculating the representative value, the measured value in a region corresponding to a non-discharge nozzle can be excluded from being used.

In the exemplary embodiment described above, variations in the measured values are extracted every 32 nozzles, but instead may be extracted every eight nozzles, or every 64 nozzles. In addition, the number of nozzles for which variations in the measurement value are extracted can be determined by estimating a cycle by a method, such as a frequency analysis or correlation calculation, on the measured value corresponding to the normal region.

In the exemplary embodiment described above, the scanning resolution for the measurement image is 1200 dpi, which is equal to the resolution for the arrangement of the nozzles of each of the printheads 101 to 104. However, the scanning resolution may be higher or lower than the resolution for the arrangement of the nozzles of each of the printheads 101 to 104. If the scanning resolution is increased, the density for each nozzle can be obtained more accurately. On the other hand, if the scanning resolution is decreased, it is difficult to detect high-frequency unevenness. In this case, however, the amount of data to be read decreases, which leads to a reduction in the cost of the system. Further, the measurement curve may be generated using the average value of measured values for a plurality of nozzles. This leads to a reduction in storage capacity for holding information about the measurement curve.

In the exemplary embodiment described above, each end of the recording sheet that is greatly affected by distortion of the recording sheet is set as the abnormal region. However, the abnormal region is also generated due to a factor other than distortion of the recording sheet. For example, a local region in which a non-discharge nozzle, stain on a recording sheet, a flaw on a surface of an image, or the like is present may be set as the abnormal region. In this case, the image forming system may include a detection unit that detects a non-discharge nozzle, stain on a recording sheet, or the like.

In a case where a recording sheet, such as embossed paper, which has a pattern formed on the entire surface thereof and on which HS processing cannot be performed, is used, the entire region of the recording sheet can be regarded as the abnormal region. In this case, the measured value in the entire region of the recording sheet is replaced with the representative value. If a disturbance caused by the pattern on the recording sheet is isotropic, the representative value calculated by averaging can be regarded as the value on which noise reduction processing has been performed. This may lead to an improvement in the accuracy of HS processing.

While the exemplary embodiment described above illustrates an example where the measured value is corrected by replacement processing every time an image is formed on a recording medium, the measured value corresponding to the abnormal region may be replaced with the measured value corresponding to the normal region in advance. In this case, the processes of steps S402 and S403 are performed in advance by the measured value obtaining unit 1302 and the measured value correction unit 1303, respectively, and the corrected measured value is held in the HDD 203 or the like. This eliminates the performing correction processing every time image data is input, which leads to a reduction in processing cost and a reduction in density unevenness in an image.

Second Exemplary Embodiment

In the exemplary embodiment described above, each patch of the measurement image is formed using only ink of a single color and HS processing is performed on each color of ink. However, even after the HS processing is performed on each color of ink, color unevenness may occur when a multi-order color is represented by superimposing two or more colors of ink. To deal with such color unevenness, a technique called multi-color shading (MCS) processing is known. Accordingly, a second exemplary embodiment illustrates processing for reducing density unevenness and streaks in an image with high accuracy even when a measured value that cannot be used is included in the measured values obtained for MCS processing.

<Functional Configuration of Image Processing Apparatus>

FIG. 3B is a block diagram illustrating the functional configuration of the image processing apparatus 300 according to the second exemplary embodiment. Image data output from the input color conversion processing unit 303 is input to an MCS processing unit 310. The MCS processing unit 310 performs correction processing based on the density characteristics of the nozzles constituting each of the printheads 101 to 104 on the printer color signal value (R', G', B') in the input image data. The MCS processing will be described in detail below. The image data having a corrected MCS color signal value (R", G", B") is output to the ink color conversion processing unit 304. Like the HS processing unit 305, the MCS processing unit 310 obtains the measured value by measuring each patch in advance. The MCS processing unit 310 has a functional configuration similar to the functional configuration of the HS processing unit 305 illustrated in FIG. 13.

A measurement image for MCS processing includes a plurality of patches obtained by changing the input signal values R, G, and B independently. In the present exemplary embodiment, five gradations of 0, 64, 128, 192, and 25 are set for each of the R, G, and B values and 53 combinations (=125) of multi-order color patches are formed. The combinations of the patches are not limited to this example. In the present exemplary embodiment, processing for forming the measurement image for MCS processing is performed through a bypass path 311 indicated by a dashed line in FIG. 3B. Thus, the image obtained after correction processing is performed by the HS processing unit 305 can be used as the measurement image. The measurement image is scanned by the scanner 107 and a scanned image is obtained. Unlike in the first exemplary embodiment, each pixel value of the scanned image is not converted into a value corresponding to one channel, but instead is held in the HDD 203 as an image having pixel values each corresponding to three channels of (R, G, B).

<Processing Executed by Image Processing Apparatus>

Figure 12B:
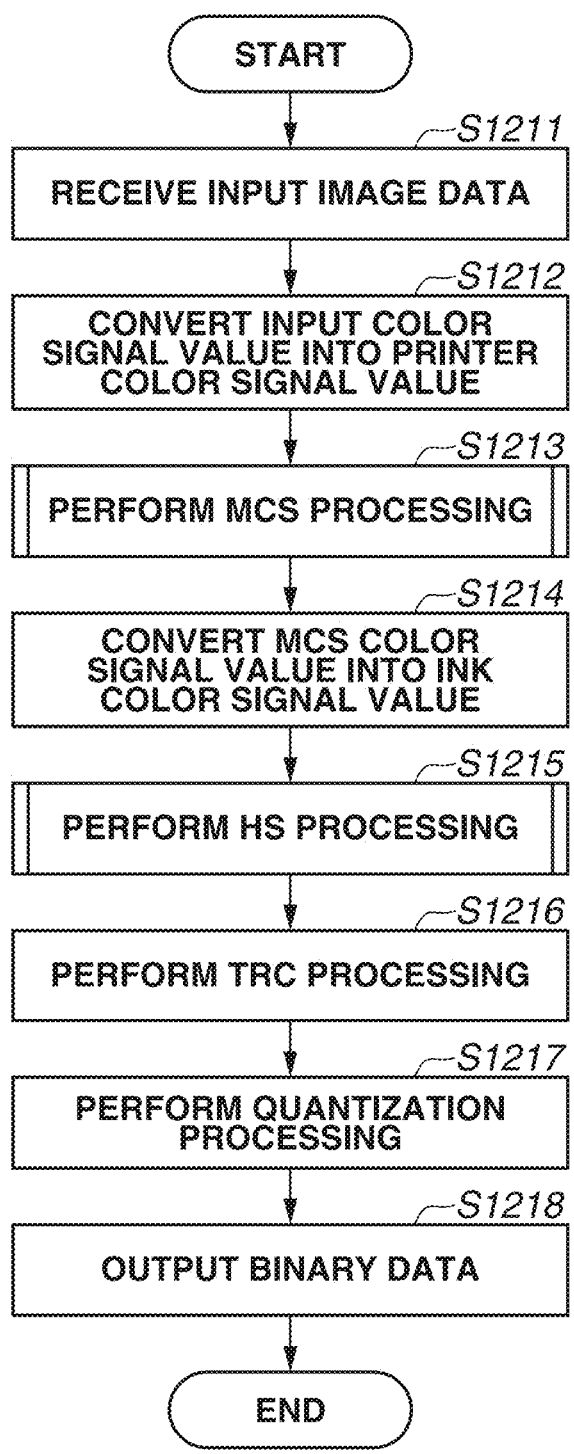

FIG. 12B is a flowchart illustrating processing executed by the image processing apparatus 300. The processing executed by the image processing apparatus 300 will be described in detail below with reference to FIG. 12B.

In step S1211, the input unit 301 receives input image data and outputs the received image data to the image processing unit 302. In step S1212, the input color conversion processing unit 303 converts the input color signal value (R, G, B) in the input image data into the printer color signal value (R', G', B') corresponding to the color reproduction range of the printer. In step S1213, the MCS processing unit 310 performs MCS processing on the image data having the printer color signal value (R', G', B'). In step S1214, the ink color conversion processing unit 304 converts the MCS color signal value (R", G", B") into the ink color signal value (K, C, M, Y) corresponding to a plurality of types of ink. In step S1215, the HS processing unit 305 performs HS processing on the image data having the ink color signal value (K, C, M, Y). In step S1216, the TRC processing unit 306 performs TRC processing on the image data having the HS color signal value (K', C', M', Y') obtained by the HS processing. In step S1217, the quantization processing unit 307 performs quantization processing on the image data having the TRC color signal value (K", C", M", Y") obtained by the TRC processing. In step S1218, the output unit 308 outputs the binary data generated by the quantization processing to the image forming apparatus 100.

<MCS Processing>

Figure 10:
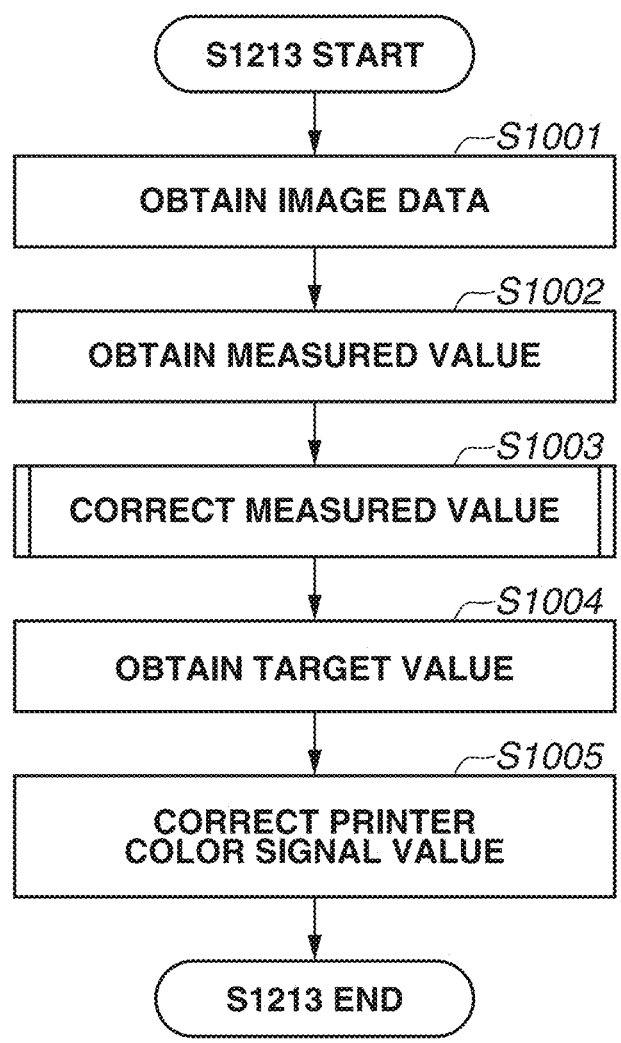
FIG. 10 is a flowchart illustrating multi-color shading (MCS) processing.

The MCS processing will be described below with reference to a flowchart illustrated in FIG. 10. The MCS processing mainly differs from the HS processing in that the measurement image illustrated in FIG. 5 is a multi-order color image and the measured value corresponds to three channels of (R, G, B).

In step S1001, the MCS processing unit 313 obtains image data having the printer color signal value (R', G', B') output from the input color conversion processing unit 303. In step S1002, the MCS processing unit 313 obtains, from the scanned image, the measured value at a nozzle position corresponding to a pixel of interest. In the present exemplary embodiment, 125 color signal values (R, G, B) are obtained as measured values for 125 patches. The measured values are obtained as image data by measuring the measurement image in advance by the scanner 107, and the image data is held in the HDD 203 or the like.

In step S1003, the MCS processing unit 313 corrects the measured value. The correction processing is performed by the processing illustrated in FIG. 8 in the same manner as in the first exemplary embodiment. The second exemplary embodiment differs from the first exemplary embodiment in that the representative value in the normal region is determined for each of the three channels of (R, G, B) and the measured value corresponding to the abnormal region is replaced with the representative value. In step S1004, the MCS processing unit 313 obtains the target value (R, G, B). In the present exemplary embodiment, the target value (R, G, B) is obtained with reference to the LUT (not illustrated) in which the correspondence relation between the printer color signal value (R', G', B') in the image data obtained in step S1001 and the target value (R, G, B) of the scanned image is held.

Figure 11:
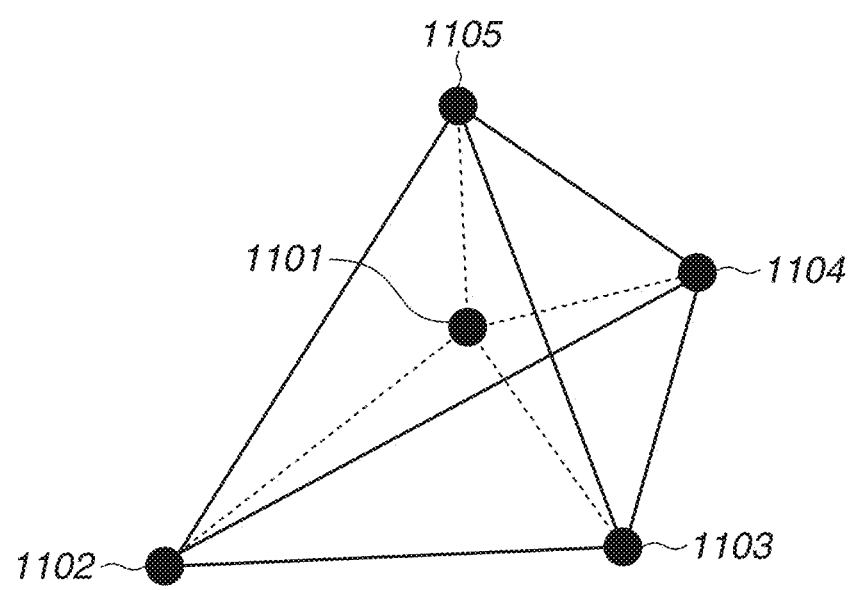
FIG. 11 illustrates a three-dimensional color space for MCS processing.

In step S1005, the printer color signal value (R', G', B') in the image data obtained in step S1001 is corrected based on the corrected measured value, and the MCS color signal value (R", G", B") is obtained. A specific method for correction processing will be described with reference to FIG. 11. FIG. 11 illustrates a three-dimensional color space having "R", "G", and "B" of the color signal value (R, G, B) in the scanned image as each axis. A target value 1101 represents the target value obtained in step S1004. Values 1102, 1103, 1104, and 1105 are four corrected measured values selected to form a minimum tetrahedron including the target value 1001 from among the 125 corrected measured values obtained in step S1003. The distance between the target value 1101 and each of the four corrected measured values 1102 to 1105 is calculated and an interpolation operation using the four corrected measured values is performed based on the ratio of the distance. The value obtained by the interpolation operation is obtained as the MCS color signal value (R", G", B") corresponding to the pixel of interest.

Advantageous Effects of Second Exemplary Embodiment

As described above, the image processing apparatus 300 according to the second exemplary embodiment replaces the measured value corresponding to the abnormal region with the measured value corresponding to the normal region and corrects the color signal value of the image by MCS processing using the replaced measured value. With this configuration, even when a measured value that cannot be used is included in the measured values obtained by measuring the measurement image, the density characteristics of each printing element can be obtained with high accuracy. In addition, the MCS processing using the density characteristics of each printing element makes it possible to reduce color unevenness in an image formed on a recording medium.

Modified Examples

The exemplary embodiment described above illustrates an example where the PC 200 functions as the image processing apparatus 300 in accordance with software installed in the PC 200. Alternatively, the image forming apparatus 100 may include the image processing apparatus 300. In a case where the image processing apparatus 300 is mounted in the image forming apparatus 100, a dedicated image processing circuit that can achieve each functional configuration of the image processing apparatus 300 may be implemented. The functions of the image processing apparatus 300 may be executed by a server that can communicate with the image forming apparatus 100. More alternatively, a part of the image processing apparatus 300 may be configured in the PC 200, and the other part of the image processing apparatus 300 may be configured in the image forming apparatus 100.

In the exemplary embodiments described above, an RGB color space is used as the color space representing each signal value of the measurement image, but any color space can be used. For example, a CIE XYZ color space or a CIEL*a*b* color space may be used.

In the exemplary embodiments described above, an image is formed using ink of four colors of K, C, M, and Y, but an image may be formed using other types of ink. For example, the above-described exemplary embodiments can also be applied to an image forming apparatus that forms an image using low-density ink of colors, such as light cyan, light magenta, and gray, or using ink of specific colors, such as red, green, blue, orange, and violet.

The exemplary embodiments described above illustrate an example where the image processing unit 302 performs processing on image data input in an RGB format represented by color signal values corresponding to three primary colors, but image data in a KCMY format may be directly input to the image processing unit 302. In this case, the processing performed by the input color conversion processing unit 303 and the processing performed by the ink color conversion processing unit 304 can be omitted in the image processing unit 302.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-180963, filed Sep. 30, 2019, which is hereby incorporated by reference herein in its entirety.

What is claimed is:

1. An apparatus that corrects a measured value obtained by measuring a measurement image formed by a-printing elements each configured to discharge ink, the measured value being used for identifying a density characteristic of the printing elements, the apparatus comprising:
   one or more processors; and
   at least one memory coupled to the one or more processors storing instructions that, when executed by the one or more processors, cause the one or more processors to function as:
   a first obtaining unit configured to obtain a plurality of measured values; and
   a first correction unit configured to replace a first measured value with a value based on a second measured value, the first measured value being included in the plurality of measured values and being unsuitable for identifying the density characteristic, the second measured value being included in the plurality of measured values and being suitable for identifying the density characteristic,
   wherein a position, where the first measured value is measured, in a direction of arrangement of the printing elements is different from a position, where the second measured value is measured, in a direction of arrangement of the printing elements.

2. The apparatus according to claim 1, wherein the first measured value is a measured value corresponding to a region in which distortion of a recording medium occurs in the measurement image formed on the recording medium.

3. The apparatus according to claim 2, wherein the distortion of the recording medium occurs at an end of the recording medium.

4. The apparatus according to claim 3, wherein the distortion of the recording medium occurs such that the end of the recording medium is uplifted.

5. The apparatus according to claim 2, wherein the first measured value is a measured value corresponding to a region with an inclination with respect to a scanner in a region of the measurement image, the scanner being configured to measure the measurement image.

6. The apparatus according to claim 1, wherein the first measured value is at least one of a measured value corresponding to a printing element configured not to discharge ink, a measured value obtained by measuring a flaw on a surface of the measurement image, and a measured value obtained by measuring a region corresponding to dirt on a surface of the recording medium on which the measurement image is formed.

7. The apparatus according to claim 1,
wherein the first measured value is a measured value obtained by measuring a predetermined first region in the measurement image, and
wherein the second measured value is a measured value obtained by measuring a predetermined second region in the measurement image.

8. The apparatus according to claim 1, wherein the first correction unit replaces a plurality of the first measured values with a plurality of representative values based on a plurality of the second measured values.

9. The apparatus according to claim 1, wherein the first correction unit replaces the measured values for each gradation of the measurement image.

10. The apparatus according to claim 1, wherein the first correction unit replaces the measured values for each color of ink for an image forming apparatus including a plurality of types of ink.

11. The apparatus according to claim 1, wherein the first correction unit replaces the measured values for each combination of colors of ink for an image forming apparatus including a plurality of types of ink.

12. The apparatus according to claim 1, wherein the one or more processors further functions as:
a second obtaining unit configured to obtain image data representing an image to be formed on a recording medium; and
a second correction unit configured to correct a signal value in the image data based on the plurality of measured values, at least some of the plurality of measured values being replaced with a value based on the second measured value.

13. The apparatus according to claim 12, wherein the one or more processors further functions as a third obtaining unit configured to obtain target characteristic data representing a target density characteristic of the printing elements,
wherein the second correction unit corrects the signal value in the image data based on the target density characteristic and the density characteristic of the printing elements specified by the plurality of measured values, at least some of the plurality of measured values being replaced with a value based on the second measured value.

14. The apparatus according to claim 13, wherein the second correction unit uses, as the density characteristic of the printing elements, a curve generated by an interpolation operation on the plurality of measured values, at least some of the plurality of measured values being replaced with a value based on the second measured value.

15. A non-transitory computer-readable storage medium storing a program for causing a computer to perform a method for correcting a measured value obtained by measuring a measurement image formed by a printing elements each configured to discharge ink, the measured value being used for identifying a density characteristic of the printing elements, the method comprising:
obtaining a plurality of measured values; and
replacing a first measured value with a value based on a second measured value, the first measured value being included in the plurality of measured values and being unsuitable for identifying the density characteristic, the second measured value being included in the plurality of measured values and being suitable for identifying the density characteristic;
wherein a position, where the first measured value is measured, in a direction of arrangement of the printing elements is different from a position, where the second measured value is measured, in a direction of arrangement of the printing elements.

16. A method for correcting a measured value obtained by measuring a measurement image formed by a-printing elements each configured to discharge ink, the measured value being used for identifying a density characteristic of the printing elements, the image processing method comprising:
obtaining a plurality of measured values; and
replacing a first measured value with a value based on a second measured value, the first measured value being included in the plurality of measured values and being unsuitable for identifying the density characteristic, the second measured value being included in the plurality of measured values and being suitable for identifying the density characteristic;
wherein a position, where the first measured value is measured, in a direction of arrangement of the printing elements is different from a position, where the second measured value is measured, in a direction of arrangement of the printing elements.

17. The method according to claim 16, wherein the first measured value is a measured value corresponding to a region in which distortion of a recording medium occurs in the measurement image formed on the recording medium.

18. The method according to claim 17, wherein the distortion of the recording medium occurs at an end of the recording medium.

19. The method according to claim 18, wherein the distortion of the recording medium occurs such that the end of the recording medium is uplifted.

20. The method according to claim 17, wherein the first measured value is a measured value corresponding to a region with an inclination with respect to a scanner in a region of the measurement image, the scanner being configured to measure the measurement image.

* * * * *